US012590830B2

(12) United States Patent
Ohler et al.

(10) Patent No.: US 12,590,830 B2
(45) Date of Patent: *Mar. 31, 2026

(54) SYSTEMS AND METHODS FOR SCALE CALIBRATION

(71) Applicants:Pelstar, LLC, McCook, IL (US); Tovey Engineering, Inc., Phoenix, AZ (US)

(72) Inventors: Michael Ohler, Phoenix, AZ (US); Ken Harris, McCook, IL (US); Brian C. Skinner, McCook, IL (US); Mike Tovey, Phoenix, AZ (US)

(73) Assignees: Pelstar, LLC, McCook, IL (US); Tovey Engineering, Inc., Phoenix, AZ (US)

( * ) Notice: Subject to any disclaimer, the term of this patent is extended or adjusted under 35 U.S.C. 154(b) by 432 days.

This patent is subject to a terminal disclaimer.

(21) Appl. No.: 18/297,345

(22) Filed: Apr. 7, 2023

(65) Prior Publication Data

US 2023/0251125 A1 Aug. 10, 2023

Related U.S. Application Data

(63) Continuation of application No. 16/924,655, filed on Jul. 9, 2020, now Pat. No. 11,624,648.

(60) Provisional application No. 62/871,870, filed on Jul. 9, 2019.

(51) Int. Cl.
    *G01G 23/01* (2006.01)
(52) U.S. Cl.
    CPC ......... *G01G 23/012* (2013.01); *G01G 23/015* (2013.01)

(58) Field of Classification Search
    CPC ..... G01G 23/012; G01G 23/015; G01G 23/01
    See application file for complete search history.

(56) References Cited

U.S. PATENT DOCUMENTS

| | | | |
|---|---|---|---|
| 1,746,351 A | 2/1930 | Hem | |
| 2,321,652 A | 6/1943 | Carliss | |
| 2,786,378 A | 3/1957 | Ethington et al. | |
| 3,194,050 A | 7/1965 | Ruge | |
| 3,738,439 A | 6/1973 | Herbert | |
| 3,924,443 A | 12/1975 | Hebert | |
| 4,090,393 A | 5/1978 | Kharitonov et al. | |

(Continued)

FOREIGN PATENT DOCUMENTS

| | | |
|---|---|---|
| AU | 2011200160 A1 | 8/2011 |
| BR | 132012032845 E2 | 8/2014 |

(Continued)

*Primary Examiner* — Alexander Satanovsky
(74) *Attorney, Agent, or Firm* — Michael Best & Friedrich LLP

(57) ABSTRACT

Systems and methods for scale calibration. One example embodiment provides a system for calibrating a scale. The system may generally include an actuator for applying force to a platform of the medical scale, and an electronic processor communicatively coupled to the actuator. The electronic processor may be configured to control an actuator to apply, for a first interval, a first applied force having a first value greater than a target force value, and control the actuator to apply, for a second interval, a second applied force having a second value substantially equal to the target force value.

20 Claims, 7 Drawing Sheets

(56) References Cited

U.S. PATENT DOCUMENTS

| | | | |
|---|---|---|---|
| 4,220,037 A * | 9/1980 | Widehn | G01G 19/021 |
| | | | 73/1.13 |
| 4,249,633 A | 2/1981 | Dunbar | |
| 4,347,904 A | 9/1982 | Dunbar | |
| 4,353,427 A | 10/1982 | Stock et al. | |
| 4,406,338 A | 9/1983 | Dumbar | |
| 4,637,481 A | 1/1987 | Shoemaker | |
| 4,658,921 A | 4/1987 | Karpa | |
| 4,722,407 A | 2/1988 | Gindy et al. | |
| 4,798,094 A | 1/1989 | Newhall et al. | |
| 4,848,478 A | 7/1989 | Hafner | |
| 4,909,338 A | 3/1990 | Vitunic et al. | |
| 5,257,668 A | 11/1993 | Sargent et al. | |
| 5,533,380 A | 7/1996 | Ferris | |
| 5,877,456 A | 3/1999 | Homer, III et al. | |
| 5,900,591 A | 5/1999 | Liu | |
| 6,278,067 B1 | 8/2001 | Allen et al. | |
| 6,414,251 B1 | 7/2002 | Edwards et al. | |
| 6,539,771 B1 | 4/2003 | Davidson et al. | |
| 6,629,446 B2 | 10/2003 | Parker | |
| 6,792,371 B1 | 9/2004 | Turner | |
| 6,861,593 B2 | 3/2005 | Kuhlmann et al. | |
| 7,681,432 B2 | 3/2010 | Hay et al. | |
| 7,788,964 B2 * | 9/2010 | Thillen | F27D 3/10 |
| | | | 73/1.13 |
| 7,975,526 B2 | 7/2011 | Genoud et al. | |
| 8,001,846 B2 | 8/2011 | Berra | |
| 8,459,092 B2 | 6/2013 | Inglin | |
| 8,839,655 B2 | 9/2014 | Bormann et al. | |
| 9,097,574 B2 | 8/2015 | Yao et al. | |
| 9,116,033 B2 | 8/2015 | Lin et al. | |
| 9,696,229 B2 | 7/2017 | Schulz et al. | |
| 2008/0164074 A1 | 7/2008 | Wurz | |
| 2008/0223625 A1 | 9/2008 | Lawler et al. | |
| 2009/0107207 A1 | 4/2009 | Yamazaki et al. | |
| 2013/0098136 A1 | 4/2013 | Yao et al. | |
| 2015/0039249 A1 | 2/2015 | Heinrich et al. | |
| 2015/0096348 A1 | 4/2015 | Schultz et al. | |
| 2016/0011038 A1 | 1/2016 | Schrag et al. | |
| 2017/0082483 A1 | 3/2017 | Vogel | |

FOREIGN PATENT DOCUMENTS

| | | | | |
|---|---|---|---|---|
| CN | 102538937 B | | 11/2013 | |
| DE | 102007036214 A1 | | 6/2008 | |
| DE | 102013105647 A1 | | 12/2014 | |
| GB | 2237651 | * | 5/1991 | G01G 23/01 |
| GB | 2517918 A | | 3/2015 | |
| JP | 2008267935 A | | 11/2008 | |

* cited by examiner

100

SYSTEMS AND METHODS FOR SCALE CALIBRATION

CROSS-REFERENCE TO RELATED APPLICATION

The present application is a continuation of and claims the benefit of the filing date of co-pending U.S. patent application Ser. No. 16/924,655, filed Jul. 9, 2020, which claims priority to U.S. Provisional Patent Application No. 62/871,870, filed Jul. 9, 2019.

FIELD

The present application relates to systems and methods for calibrating scales, for example, medical scales, and, more particularly, to controlling a calibration device, which applies force to scales to calibrate and test the scales.

SUMMARY

Scales are used in healthcare environments (for example, facilities with both critical care and primary care) to measure the weight of a patient. A weight of the patient can provide important or useful information to, for example, detect fluid retention, calculate proper medication dosages, screen for malnutrition, etc. It is therefore desirable for medical scales to provide accurate weight measurements to healthcare professionals and other users.

Because medical scales are used to provide information for patient care, medical scales may be calibrated regularly or from time to time as deemed necessary. Other types of scales are also relied upon for accurate measurements and may, therefore, be regularly calibrated. Typical calibration methods use reference weights, and the calibration process can be expensive (for example, about 35-90% of the cost of a new scale per calibration), labor intensive and time-consuming, especially for a facility with numerous scales.

Because weight is a measure of the force of gravity on the object being weighed, the measurement of weight varies with the gravity for the location where the weighing occurs. Scales must therefore be calibrated in the field where they are deployed.

Calibration reference weights must be carefully maintained and are difficult and expensive to transport to the location of each scale to be calibrated. Furthermore, calibration with reference weights requires placing and removing weights on the scale platform multiple times for each set point across a calibration range. For example, a scale may be calibrated at 100 pounds, 200 pounds, 300 pounds, and 400 pounds. The repeated moving of reference weights (e.g., weighing 50 pounds each) during this process may present a risk of damage to scale components and/or other items in the area, including the scale calibrators themselves.

Calibrating a scale using calibration reference weights limits the upper calibration range to the amount of weights that can be transported by calibrator. For example, a scale cannot be calibrated at the 400 pound level using reference weights if only 300 pounds of reference weights are present. In addition, the granularity of the calibration is limited by the types and numbers of calibration reference weights transported by a calibrator. For example, to calibrate in one, ten, or five pound increments would require transporting and caring for a sufficient quantity of those reference weight sizes in addition to the larger sizes required to calibrate at higher (for example, 100 pound) increments.

To potentially address these and other concerns, calibration devices have been developed. Such devices apply force directly to a platform of a scale to simulate a weight for use in calibrating and testing the scale. Some scale calibration devices apply an intended calibration force for a period of time.

During the calibration process, it is important that the intended calibration force remains constant in order to accurately calibrate the scale. However, some calibration devices exhibit a decay over time in the exerted force on the scale. This decay may be due to flexing of the materials comprising the calibration device, the scale, etc. The decay in exerted pressure can lead to inaccurate calibration or testing of a scale. In some instances, the decay is relatively rapid. However, waiting for the decay to decrease to a useful level for each set point in a calibration range can significantly increase the time required for a scale calibration, lead to errors in calibration, or both.

Accordingly, independent embodiments described herein provide, among other things, systems and methods for calibration of scales, and such systems or methods may be at least partially automated.

One independent embodiment provides a method for calibrating a scale, such as, for example, a medical scale. The method may generally include applying (e.g., controlling an actuator to apply), for a first interval, a first applied force having a first value greater than a target force value; and, after the first interval, applying, for a second interval, a second applied force having a second value substantially equal to the target force value.

Another independent embodiment provides a system for calibrating a scale. The system may generally include an actuator for applying force to a platform of the medical scale, and an electronic processor communicatively coupled to the actuator. The electronic processor may be configured to control an actuator to apply, for a first interval, a first applied force having a first value greater than a target force value, and control the actuator to apply, for a second interval, a second applied force having a second value substantially equal to the target force value.

In yet another independent embodiment, a method for calibrating a scale may generally include controlling the actuator to apply, for a calibration interval, an applied force having an applied force value substantially equal to a target force value, during the calibration interval, receiving, from a load sensing device (e.g., a load cell), an applied force value for the applied force, when the applied force value is less than the target force value by a first threshold, controlling the actuator to increase the second applied force to the target force value, and, when the applied force value is greater than the target force value by a second threshold, controlling the actuator to reduce the second applied force to the target force value.

In a further independent embodiment, a method for calibrating a scale may generally include controlling an actuator to apply, for a first interval, a first applied force having a first value greater than a target force value, controlling the actuator to apply, for a second interval, a second applied force having a second value substantially equal to the target force value, during the second interval, receiving, from a load sensing device (e.g., a load cell), an applied force value for the second applied force, when the applied force value is less than the target force value by a first threshold, controlling the actuator to increase the second applied force to the target force value, and, when the applied force value is greater than the target force value by a second threshold, controlling the actuator to reduce the second applied force to the target force value.

In another embodiment, a system for calibrating a scale may generally include a human machine interface; an actuator for applying force to a platform of the medical scale; and an electronic processor communicatively coupled to the human machine interface and the actuator. The electronic processor may be configured to receive a target force value by receiving a user input via the human machine interface, in response to receiving the user input, control the actuator to apply, for a pre-calibration interval, a preliminary applied force having a preliminary value, when the pre-calibration interval has expired, disengage the actuator, display, via the human machine interface, a user prompt requesting a confirmation command, and, in response to receiving the confirmation command, control an actuator to apply, for a first interval, a first applied force having a first value greater than the target force value, and control the actuator to apply, for a second interval, a second applied force having a second value substantially equal to the target force value.

Using such embodiments, scales, such as medical scales, may, for example, be calibrated more quickly, accurately, etc.

Other independent aspects of the invention may become apparent by consideration of the detailed description, claims, and accompanying drawings.

DETAILED DESCRIPTION

Figure 1:
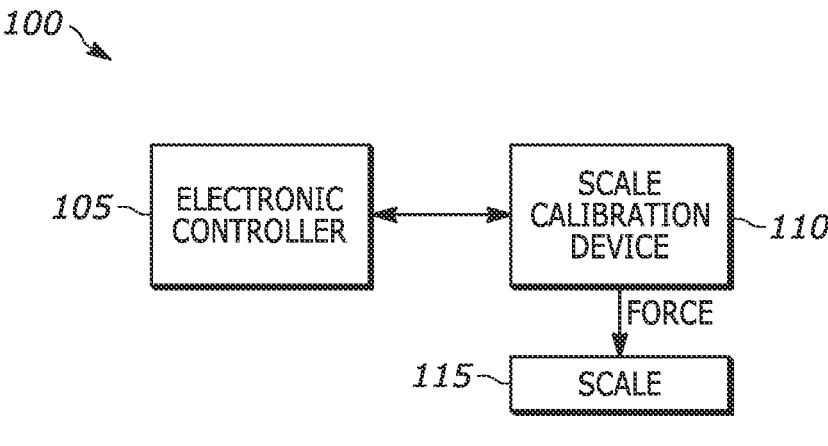
FIG. 1 is a block diagram of a scale calibration system, according to some independent embodiments.

Before any independent embodiments are explained in detail, it is to be understood that the embodiments presented herein are not limited in their application to the details of construction and the arrangement of components set forth in the following description or illustrated in the following drawings. The independent embodiments presented herein are capable of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. The terms "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Relative terminology, such as, for example, "about," "approximately," "substantially," etc., used in connection with a quantity or condition would be understood by those of ordinary skill to be inclusive of the stated value or condition and has the meaning dictated by the context (for example, the term includes at least the degree of error associated with the measurement of, tolerances (e.g., manufacturing, assembly, use, etc.) associated with the particular value or condition, etc.). Such terminology should also be considered as disclosing the range defined by the absolute values of the two endpoints. For example, the expression "from about 2 to about 4" also discloses the range "from 2 to 4." The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

It should also be noted that a plurality of hardware and software-based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (for example, stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example independent embodiment of a scale calibration system 100 for calibrating a scale (for example, a medical scale). In the example illustrated, the system 100 includes an electronic controller 105 and a scale calibration device 110. The scale calibration device 110 may be similar to the devices illustrated and described in U.S.

patent application Ser. No. 16/145,276, filed Sep. 28, 2018, the entire contents of which are hereby incorporated by reference.

The illustrated components, along with other various modules and components, are coupled to each other by or through one or more control or data buses that enable communication therebetween. The use of control and data buses for the interconnection between and exchange of information among the various modules and components would be apparent to a person skilled in the art in view of the description provided herein.

The scale calibration device 110 is configured to receive commands from the electronic controller 105 and to apply a force, based on the received commands, to a scale 115 to be calibrated. The scale calibration device 110 is communicatively connected to the electronic controller 105 via one or more communication links and, in this example, via a wired connection; however, in some embodiments, the scale calibration device 110 may be communicatively connected over a wireless network or a short-range wireless connection.

Figure 2:
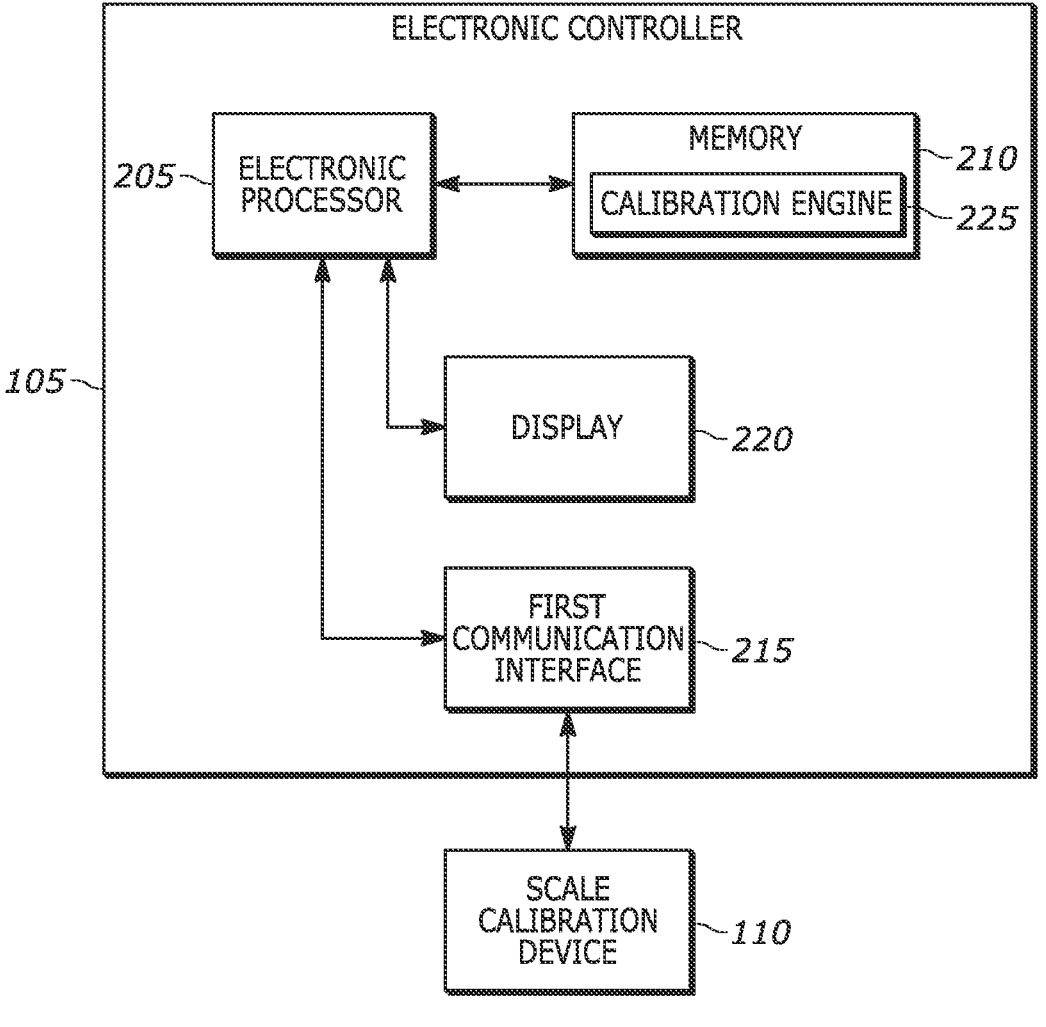
FIG. 2 is a block diagram of an electronic controller of the system of FIG. 1 according to one embodiment.

FIG. 2 is a block diagram of the electronic controller 105 of the system of FIG. 1. The electronic controller 105 includes a plurality of electrical and electronic components that provide power, operation control, and protection to the components and modules within the electronic controller 105. The illustrated electronic controller 105 includes, among other things, an electronic processor 205 (such as a programmable electronic microprocessor, microcontroller, or similar device), a memory 210, a first communication interface 215, and a display 220. In some embodiments, the electronic controller 105 is a computing device, such as a laptop computer, a tablet computer, a smart phone, a smart watch, etc.

The memory 210 is, for example, a non-transitory, machine-readable memory. The first communication interface 215 is communicatively connected to the scale calibration device 110. The electronic processor 205 is communicatively connected to the memory 210, and the first communication interface 215. The memory 210 includes a calibration engine 225 (for example, software or a set of computer-readable instructions that determines commands to be sent to the scale calibration device 110).

The electronic controller 105 may be implemented in several independent controllers each configured to perform specific functions or sub-functions. Additionally, the electronic controller 105 may contain sub-modules that include additional electronic processors, memory, or application specific integrated circuits (ASICs) for handling communication functions, processing of signals, and application of the methods listed below. In other embodiments, the electronic controller 105 includes additional, fewer, or different components.

The first communication interface 215 coordinates the communication of information between the electronic processor 205 and the scale calibration device 110. In the example illustrated, information received from the display 220 is provided to the electronic processor 205 to assist in determining what commands will be executed by the calibration engine 225. The determined commands are then provided from the electronic processor 205 to the first communication interface 215 where the commands are transmitted to the scale calibration device 110. In other embodiments, the information received from the display 220 may be provided without a display and may be, for example, transmitted from a remote server where the information is stored in a storage medium, such as a database.

The memory 210 can include one or more non-transitory machine-readable media, and includes a program storage area and a data storage area. The program storage area and the data storage area can include combinations of different types of memory, as described herein. In some embodiments, data is stored in a non-volatile random-access memory (NVRAM) of the memory 210. Furthermore, in some embodiments, the memory 210 stores predetermined factors with which to adjust commands, such as a predetermined gravity factor as well as other factors that may be used to manipulate or alter the determined commands for the scale calibration device 110 (as described in more detail below).

Figure 3:
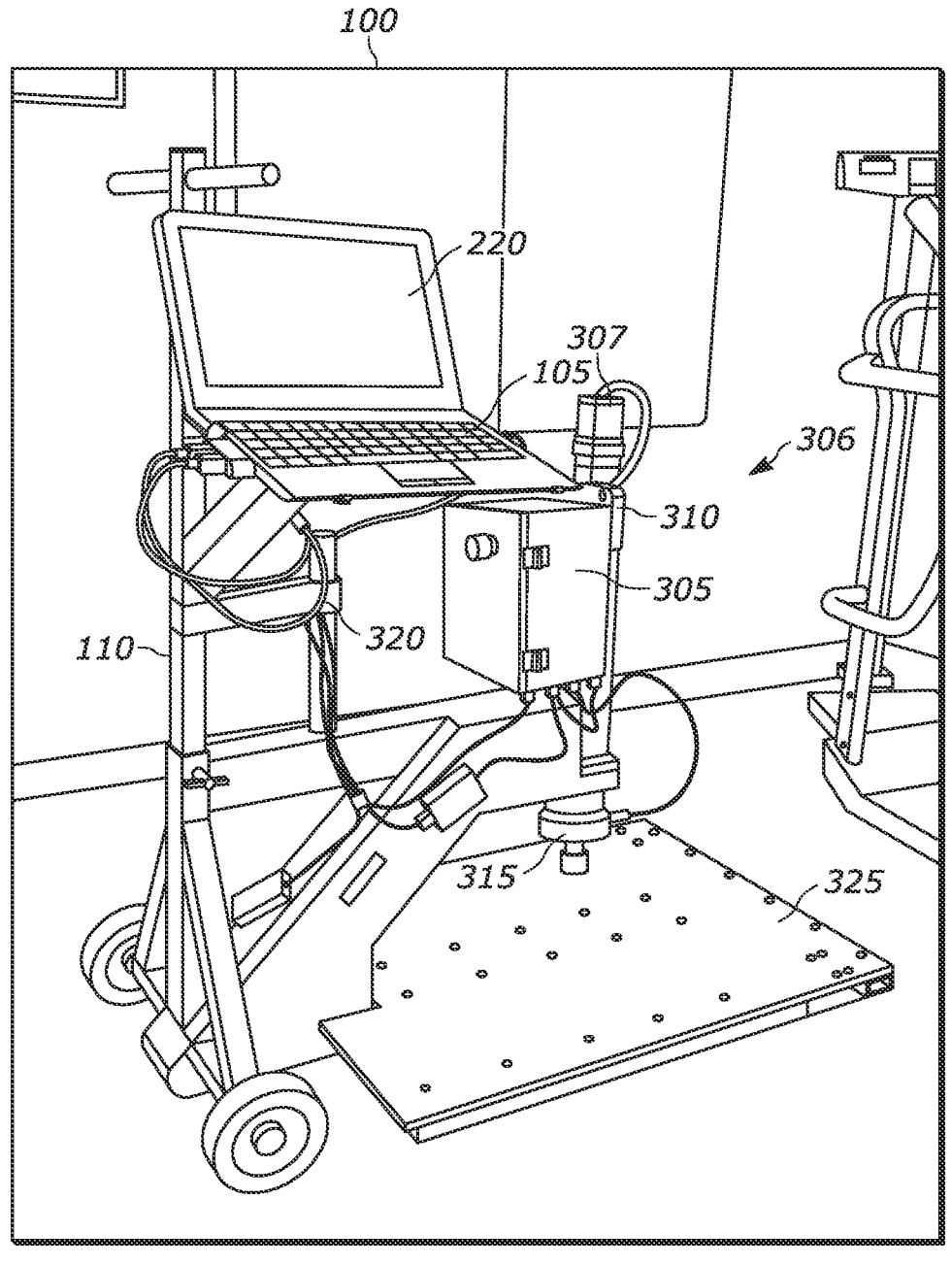
FIG. 3 depicts an example embodiment of the scale calibration device of the system of FIG. 1.

FIG. 3 illustrates an example construction of the system 100. In the illustrated construction, the scale calibration device 110 includes a control box 305, a force applying mechanism 306 (e.g., a motor 307 and an actuator 310), a load cell 315, a wired connection 320 between the electronic controller 105 and the scale calibration device 110, and a base surface 325 for a scale (not shown) to rest on during testing and calibration. In the illustrated construction, the electronic controller 105 is a laptop computer communicatively connected, via a wired connection (as illustrated), to the scale calibration device 110. However, in other embodiments, the electronic controller 105 may be another type of computing device and/or may be coupled wirelessly with the scale calibration device 110.

The control box 305 is communicatively coupled to the electronic controller 105 and includes one or more electronic components configured to control the force applying mechanism 306 to apply a force (e.g., on a scale to be tested or calibrated according to the methods described herein). In the illustrated construction, the load cell 315 is supported at the end of the actuator 310 to measure the applied force of the force applying mechanism 306 (e.g., on a scale). In some embodiments, a load sensing device or a force measurement mechanism other than a load cell may be used. The control box 305 receives commands from the electronic controller 105 and causes the force applying mechanism 306 to apply the specified force (e.g., by controlling the motor 307 to move the actuator 310 downwardly).

In the illustrated construction, the force applying mechanism 306 includes the motor 307 (e.g., a stepper motor, a servo motor, etc.) and the actuator 310 (e.g., including an internal gear set). In other embodiments, an alternate force applying mechanism (e.g., a hydraulic cylinder assembly) may be used. The force is applied to the scale by activating the force applying mechanism 306 to establish the specified level of force (e.g., as a proxy for a test weight) on the scale. The scale calibration device 110 may be operated to calibrate and test scales across a load range (e.g., across the entire rated load range of the scale).

In the illustrated construction, the force applying mechanism 306 is operated automatically. In some embodiments, the force applying mechanism 306 may be controlled manually (e.g., using physical controls (not shown) or virtual controls provided via the display 220). In the provided example, the display 220 is used to select a weight/force to be applied, and the force applying mechanism 306 may be adjusted to apply the selected force. In some embodiments, the display 220 may be external to the electronic controller 105 and included in a second external electronic controller (e.g., a computing device such as a laptop computer, a tablet computer, a smart phone, a smart watch, etc.) communicatively connected (e.g., via a wireless connection) to the electronic controller 105. In other embodiments, the system 100 may not contain a display and the weight/force can be identified from a remote storage medium and transmitted to the electronic controller 105.

Figure 4:
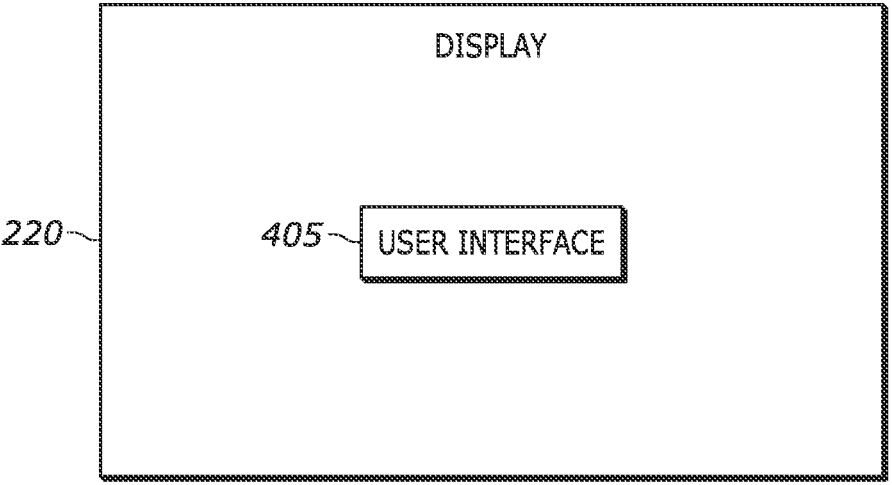
FIG. 4 is a block diagram of a display of the system of FIG. 1 according to one embodiment.

FIG. 4 is a block diagram of the display 220 of the electronic controller 105 of FIG. 2. The illustrated display 220 includes, among other things, a user interface 405. In some embodiments, the display 220 is a touch screen, and, in other embodiments, the display is controlled by a mouse and keyboard. In the example illustrated, the display 220 is integrated within the electronic controller 105.

As noted, in some embodiments (not shown), the display 220 may be external to the electronic controller 105. When the display 220 is external, it may be part of a second electronic controller, such as a mobile computing device. In such embodiments, the electronic controller 105 is wirelessly connected to the second electronic controller. In embodiments lacking a display, the input is predetermined within a storage medium and can be selected based upon attributes of the scale to be calibrated.

The user interface 405 (e.g., a graphical user interface) allows users to interact with the system 100 and, potentially, to specify target values and gravity correction factors. The user interface 405 is not limited to these features and may, in other embodiments, allow users to enter additional information.

Figure 5:
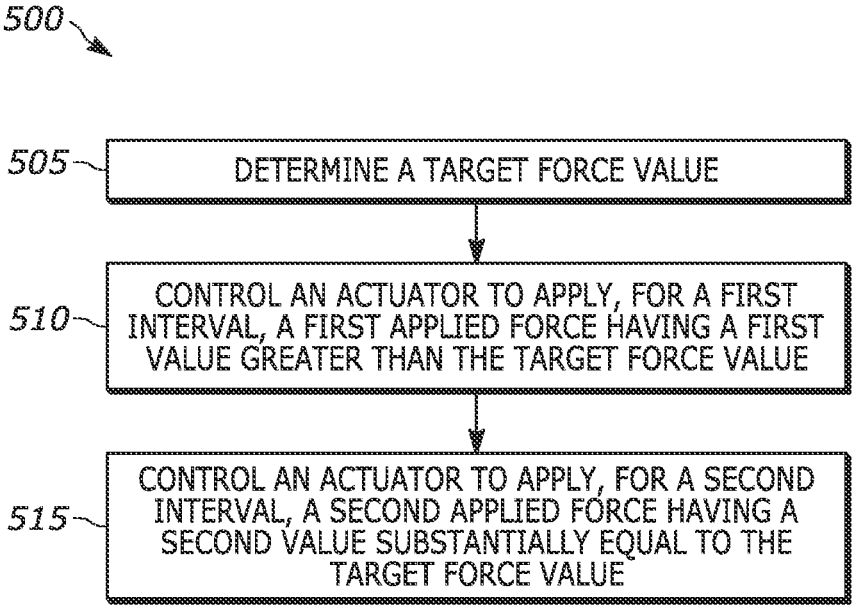
FIG. 5 is a flowchart of a method of using a calibration engine of the electronic controller of FIG. 2 to receive a target force value and control an actuator based on the target force value according to one embodiment.

FIG. 5 illustrates an example method 500 for calibrating a scale using the scale calibration device 110. In some embodiments, the method 500 is performed by the electronic processor 205 and, in particular, the electronic processor 205 executing the calibration engine 225.

At block 505, the electronic processor 205 determines a target force value. For example, the target force value may be received from the user interface 405. In another example, the target force value may be received from an external source.

In some embodiments, the target force value is based on a requested target force value and a gravity correction factor. The gravity correction factor corrects for the gravity in the geographic location where the calibration is occurring. In some embodiments, the gravity correction factor is provided via a user input. In other embodiments, the gravity correction factor is retrieved from a database or a remote server based on the location of the scale calibration device 110 (e.g., as determined using an electronic geolocation system or provided via the user interface 405).

Once the target force value has been received, the electronic processor 205 determines a first value that is greater (e.g., by an amount, a percentage, etc.) than the target force value. For example, if the target force value is a force value that corresponds to 200 pounds of weight, then the electronic processor 205 may determine the first value to be a force value that corresponds to 210 pounds of weight. After the first value is determined, the electronic processor 205 controls the actuator 310 to apply a first applied force having the first value for a first or "pre-load" interval of time (e.g., for 30 seconds) (block 510).

In some embodiments, after the target force value is received, a preliminary force value is used to control the actuator 310. The preliminary force value is a value substantially less than the target force and is used to confirm a user's desire to begin the calibration process. The preliminary force is applied for a pre-calibration interval to, for example, confirm that the user intends to initiate calibration, give the user a period of time to ensure that the scale to be calibrated is positioned properly and without interference (e.g., from a user's clothing, appendages, other items, etc.). When the pre-calibration interval has expired, the actuator 310 is disengaged causing the preliminary force to no longer be applied, and a user prompt requesting a confirmation command is displayed, via the user interface 405. In some embodiments, the pre-calibration interval is set to zero so the actuator 310 moves into the disengaged/wait routine as soon as the pre-calibration force is achieved.

In some embodiments, the actuator 310 is disengaged by reversing the motor 307 (e.g., a stepper motor) to retract the actuator 310 until the load cell 315 indicates that no force is being applied. In some embodiments, the actuator 310 is disengaged by reversing the motor 307 (e.g., a servo motor) to move the actuator 310 a predetermined distance (for example, 1116th of an inch). If a response to the user prompt indicates an abort command, the actuator 310 is fully disengaged (e.g., is fully retracted). In the response to a user prompt indicating a confirmation, the calibration process continues.

In some embodiments, after the user confirmation is received, the electronic processor 205 determines whether certain physical conditions have changed before continuing with the calibration process. For example, the electronic processor 205 may be configured to determine whether the scale has moved since the preliminary force was applied. In some embodiments, the electronic processer 205 determines that the scale has moved when the load cell 315 registers no increase in applied force after the actuator 310 engages for a threshold period. In some embodiments, the threshold period is based on amount of time that passed between the controlling the actuator to apply the preliminary force and the load cell 315 registering the preliminary force.

In some embodiments (e.g., when the actuator is controlled to retract a predetermined distance, as noted above), the electronic processer 205 determines that the scale has moved when the load cell 315 registers no increase in applied force after the actuator 310 has moved a predetermined distance (for example, 118th of an inch) with no increase in the measured applied force. Whether measured using time or distance, the lack of measured applied force indicates that the actuator 310 is effectively pushing against nothing, and, in response, the electronic processor 205 aborts the calibration process.

Upon the expiration of the first interval of time, the electronic processor 205 controls the actuator 310 to apply a second applied force having a second value for a second or "calibration" interval of time (block 515). The second value is substantially equal to the target force value (received at block 505) (i.e., as close as possible to the target force value, given the physical and electronic constraints of the scale calibration device 110). In some embodiments, the second value is within an acceptable tolerance of the calibration value (e.g., within five one-hundredths of a percent). The second interval is set to allow an operator to run the calibration function of the scale being calibrated. In some embodiments, the second interval is indefinite and must be ended using a user input.

In some embodiments, controlling the actuator 310 to apply the target force includes initially applying a force slightly different than (e.g., below) the target force value and then adjusting (e.g., increasing) the force to the target force value. For example, if the target force value is a force value that corresponds to 200 pounds of weight, then the electronic processor 205 may determine the second value to be a force value that represents between 195 pounds and 199 pounds of weight. In some embodiments, upon the expiration of the first interval of time, the electronic processor 205 controls the actuator 310 to apply an applied force having a force value that is less than the target force value, after which the force is increased to the target force value over a relatively brief "loading" time interval (e.g., less than 5 seconds).

In some embodiments, the method 500 is repeated for a series of target force values across a calibration range. For example, a medical scale may be calibrated at target force values of 100, 200, 300, and 400 pounds.

In some embodiments, the electronic processor 205 operates to maintain the applied force at or near the target force value using a hysteresis process. For example, during the calibration time interval (during which the target force is being applied), the electronic processor 205 receives and analyzes an applied force value (from the load cell) for the second applied force. When the applied force value is less than the target force value by a first threshold (e.g., 0.4 pounds), the electronic processor 205 controls the actuator 310 to increase the third applied force to the target force value. When the applied force value is greater than the target force value by a second threshold (e.g., an amount (1 pound), a percentage of the target force value, etc.), the electronic processor 205 controls the actuator 310 to reduce the third applied force to the target force value.

As described, the first and second thresholds for the hysteresis process are different. In other embodiments, these thresholds may be the same or may be reversed (e.g., the second threshold higher than the first threshold).

Figure 6:
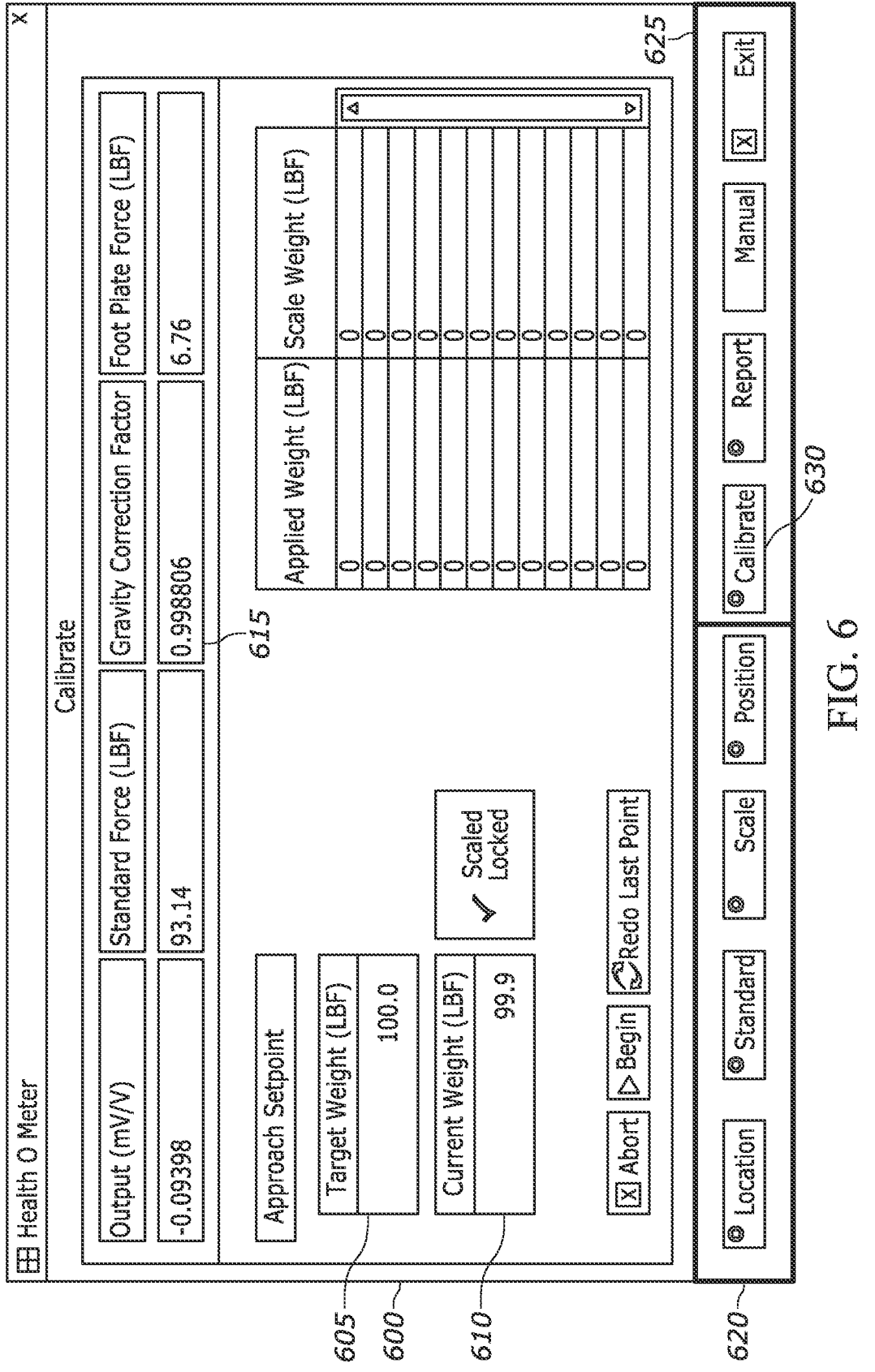
FIG. 6 is an illustration of a user interface for calibrating a scale according to one embodiment.

FIG. 6 illustrates an example user interface 600 generated by the electronic controller 105 for display on the display 220. In the example shown, the user interface 600 is in a process of calibrating a scale and displays a target weight 605, to which the scale is being calibrated. A current weight 610 that is being applied, as measured by the load cell 315, is displayed. A gravity correction factor 615 displayed is set by the user in a different user interface; however, in other embodiments, this can automatically be calculated based on a location determined via automated geolocation, as described earlier.

A group of completed status indicators 620 are configuration steps that the user has completed. A group of uncompleted status indicators 625 are steps within the calibration process that user has not seen or completed. Upon completion of the example user interface 600, a calibration indication 630 will display green indicative of being complete.

Although the status indicators 620 and 625 show a list of steps, the calibration process in other embodiments may consist of more or fewer steps. In some embodiments, steps may be automated and will not need user configuration. For example, the positioning and location configuration steps may be automated and may not need manual user intervention.

Figure 7:
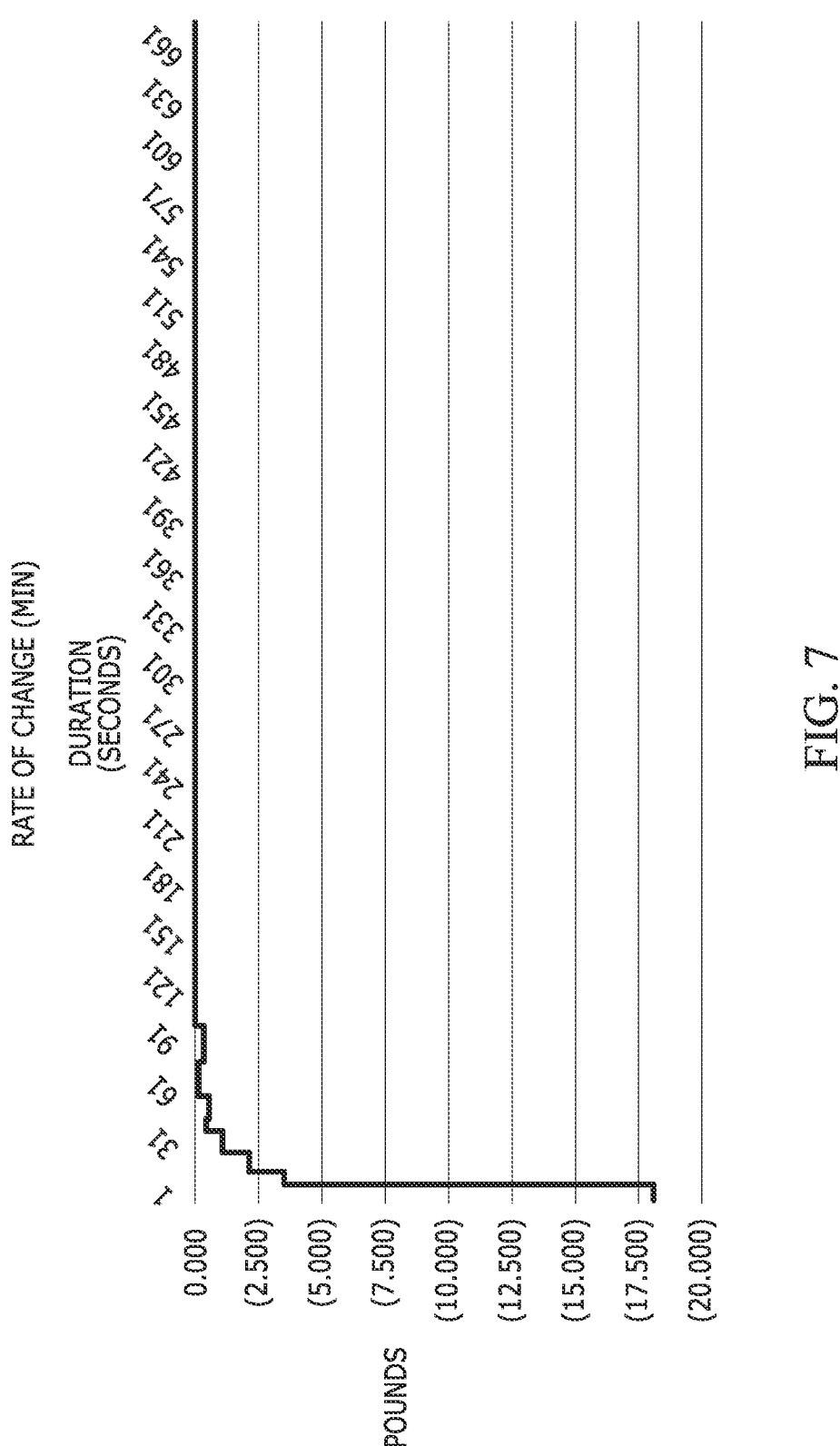
FIGS. 7-9 are line graphs illustrating the rate of change experienced by a load cell during a calibration sequence.

FIG. 7 is a line graph illustrating an example rate of change per second experienced by the load cell 315 of the scale calibration device 110 when the device 110 is configured to apply force immediately at the target value (i.e., without using the methods described herein). As shown in FIG. 7, the applied force drops at a rate of 17.5 pounds per minute for 20 seconds. In order to get a stable reading (e.g., an applied force that oscillates within the rated accuracy for the scale being calibrated) for calibration purposes, the device 110 must be allowed to settle for approximately 130 seconds.

Figure 8:
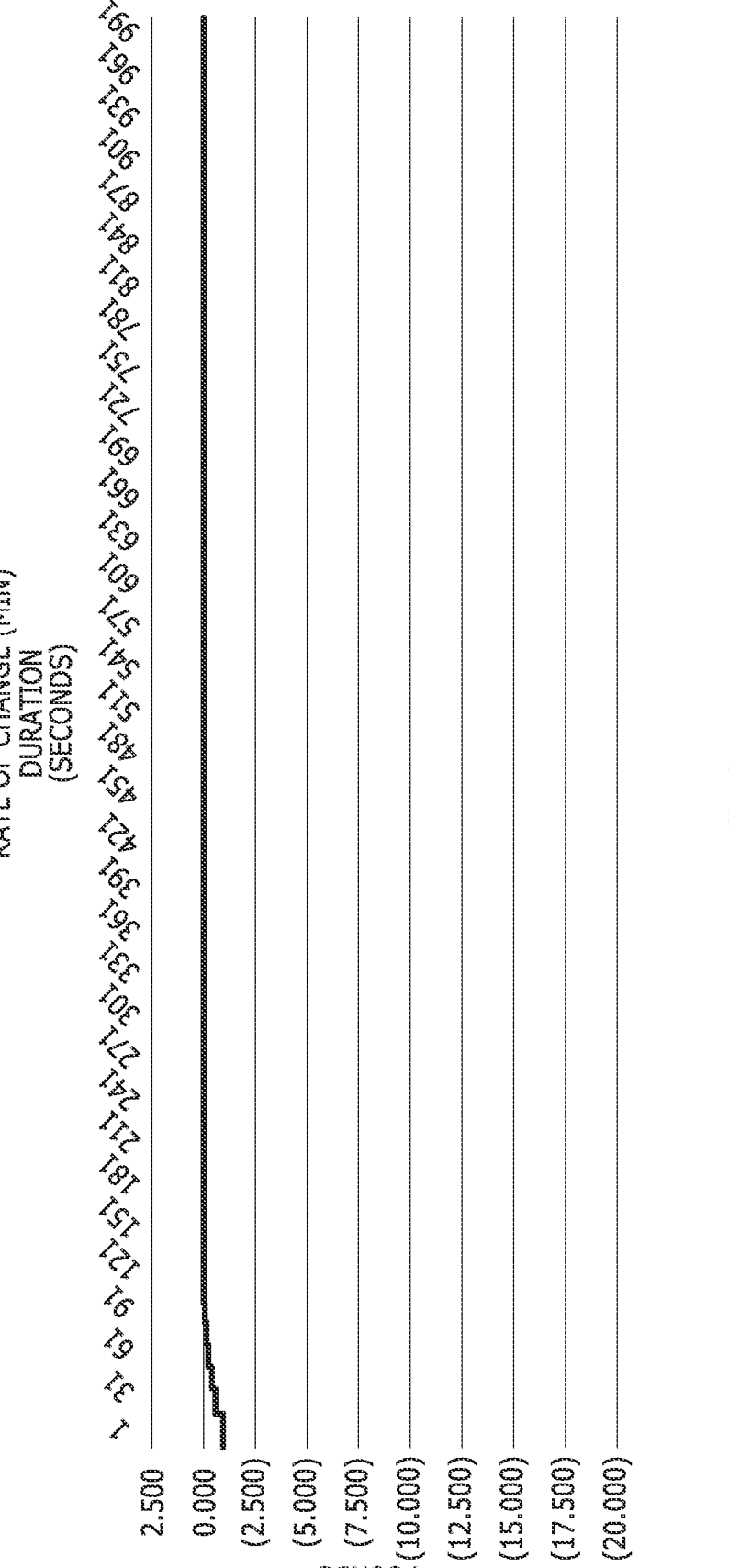

FIG. 8 is a line graph illustrating the rate of change per second experienced by the load cell 315 of the scale calibration device 110 when the device 110 is configured to apply force using the methods described herein. As shown in FIG. 8, the applied force drops only about 1 pound and stabilizes within 30 seconds.

Figure 9:
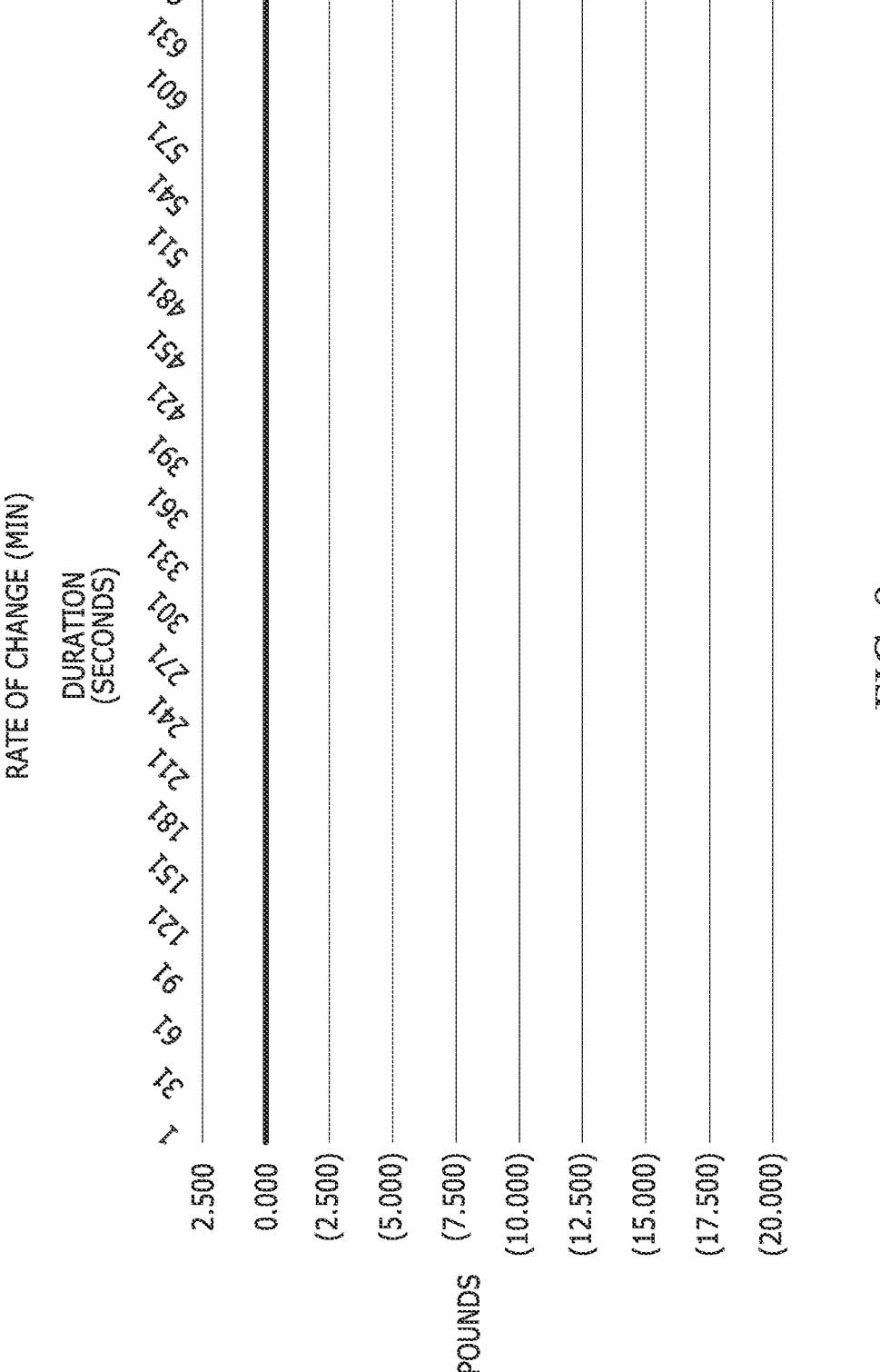

FIG. 9 is a line graph illustrating the rate of change per second experienced by the load cell 315 of the scale calibration device 110 when the device 110 is applying force at the target value during the third interval (as described above with respect to the method 500). In FIG. 9, the device 110 is applying the hysteresis process described above. As shown in FIG. 9, the applied force stabilizes almost immediately and holds substantially at the target value indefinitely.

Thus, the invention may provide, among other things, systems and methods for automatically calibrating scales, such as, for example, medical scales.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

One or more independent features and/or independent advantages of some embodiments may be set forth in the following claims:

What is claimed is:

1. A system for calibrating a scale, the system comprising:
a human machine interface; and
an actuator configured to apply force to a platform of the scale to simulate placing a weight on the platform; and
an electronic processor communicatively coupled to the human machine interface and the actuator and configured to:
(a) electronically control the actuator, to apply, for a first interval, a first applied force to the platform, the first applied force having a first value greater than a target force value representing an intended calibration force; and
(b) electronically control the actuator to apply, for a second interval, a second applied force to the platform, the second applied force having a second value substantially equal to the target force value.

2. The system of claim 1, wherein the electronic processor is further configured to control the actuator to apply the second applied force by:
prior to applying the second applied force, controlling the actuator to apply a third applied force having a third value less than the target force value, and
after controlling the actuator to apply the third applied force, controlling the actuator to increase the applied force to the second value.

3. The system of claim 1, further comprising a load cell communicatively coupled to the electronic processor and configured to measure the force applied by the actuator, and wherein the electronic processor is configured to, during the second interval, receive, from the load cell, an applied force value for the second applied force.

4. The system of claim 3, wherein the electronic processor is further configured to, when the applied force value is less than the target force value by a first threshold, control the actuator to increase the second applied force to the target force value.

5. The system of claim 3, wherein the electronic processor is further configured to, when the applied force value is greater than the target force value by a second threshold, control the actuator to reduce the second applied force to the target force value.

6. The system of claim 1, wherein the electronic processor is further configured to determine a plurality of target force values, and repeat acts (a) and (b) for each of the plurality of target force values.

7. The system of claim 1, wherein the electronic processor is further configured to determine a location for the scale, and retrieve, from an electronic memory, a gravity correction factor based on the location, and wherein the first value and the second value are determined based on the gravity correction factor and the target force value.

8. The system of claim 1, wherein the electronic processor is configured to before proceeding with act (a), control the actuator to apply, for a pre-calibration interval, a preliminary applied force having a preliminary value.

9. A system for calibrating a scale, the system comprising:

a human machine interface; and an actuator configured to apply force to a platform of the scale to simulate placing a weight on the platform; and an electronic processor communicatively coupled to the human machine interface and the actuator and configured to:

(a) electronically control the actuator, to apply, for a first interval, a first applied force to the platform, the first applied force having a first value greater than a target force value representing an intended calibration force; and (b) during the first interval, receive, from a load cell, an applied force value for the first applied force, wherein the applied force value is measured by the load cell; and (c) when a rate of change of the applied force value measured by the load cell passes a rate of change threshold, determine an end of the first interval.

10. The system of claim 9, wherein the electronic processor is further configured to control the actuator to apply the second applied force by:

prior to applying the second applied force, controlling the actuator to apply a third applied force having a third value less than the target force value, and after controlling the actuator to apply the third applied force, controlling the actuator to increase the applied force to the second value.

11. The system of claim 9, further comprising a load cell communicatively coupled to the electronic processor and configured to measure the force applied by the actuator, and wherein the electronic processor is configured to, during the second interval, receive, from the load cell, an applied force value for the second applied force, wherein the applied force value for the second applied force is measured by the load cell.

12. The system of claim 11, wherein the electronic processor is further configured to, when the applied force value measured by the load cell is less than the target force value by a first threshold, control the actuator to increase the second applied force to the target force value.

13. The system of claim 11, wherein the electronic processor is further configured to, when the applied force value for the second applied force measured by the load cell is greater than the target force value by a second threshold, control the actuator to reduce the second applied force to the target force value.

14. The system of claim 9, wherein the electronic processor is further configured to determine a plurality of target force values, and repeat acts (a) and (b) for each of the plurality of target force values.

15. A non-transitory computer-readable medium including instructions executable by an electronic processor to perform a set of functions, the set of functions comprising:

(a) receiving a user input via a human machine interface, the user input including a target force value representing an intended calibration force;

(b) in response to receiving the user input, electronically controlling an actuator, to apply, for a first interval, a first applied force having a first value greater than a target force value, wherein the actuator configured to apply force to a platform of the scale to simulate placing a weight on the platform;

(c) electronically controlling the actuator to apply, for a second interval, a second applied force having a second value substantially equal to the target force value; and (d) when the second interval has expired, electronically disengaging the actuator.

16. The non-transitory computer-readable medium of claim 15, wherein controlling the actuator to apply the second applied force includes, prior to applying the second applied force, electronically controlling the actuator to apply a third applied force having a third value less than the target force value.

17. The non-transitory computer-readable medium of claim 15, wherein the set of functions further comprises:

during the second interval, receiving, from a load cell, an applied force value for the second applied force;

when the applied force value is less than the target force value by a first threshold, electronically controlling the actuator to increase the second applied force to the target force value; and when the applied force value is greater than the target force value by a second threshold, electronically controlling the actuator to reduce the second applied force to the target force value.

18. The non-transitory computer-readable medium of claim 15, wherein the set of functions further comprises:

determining a location for the scale;

retrieving, from an electronic memory, a gravity correction factor based on the location; and wherein the first value and the second value are determined based on the gravity correction factor and the target force value.

19. The non-transitory computer-readable medium of claim 15, wherein the set of functions further comprises:

in response to receiving the user input, electronically controlling the actuator to apply, for a pre-calibration interval, a preliminary applied force having a preliminary value;

when the pre-calibration interval has expired, disengaging the actuator; and displaying, via the human machine interface, a user prompt requesting a confirmation command before proceeding with act (b).

20. The non-transitory computer-readable medium of claim 15, wherein the set of functions further comprises:

during the first interval, receiving, from a load cell, an applied force value for the first applied force; and when a rate of change of the applied force value passes a rate of change threshold, determining an end of the first interval.

* * * * *